(12) United States Patent
Parmely

(10) Patent No.: US 7,617,699 B1
(45) Date of Patent: Nov. 17, 2009

(54) PORTABLE ICE MAKER

(76) Inventor: Charles Parmely, 252 Rendezvous Rd., Riverton, WY (US) 82501

( * ) Notice: Subject to any disclaimer, the term of this patent is extended or adjusted under 35 U.S.C. 154(b) by 56 days.

(21) Appl. No.: 11/950,582

(22) Filed: Dec. 5, 2007

(51) Int. Cl.
F25B 15/00 (2006.01)

(52) U.S. Cl. .......................... 62/476; 62/110

(58) Field of Classification Search .................. 62/476, 62/480, 110; 95/900
See application file for complete search history.

(56) References Cited

U.S. PATENT DOCUMENTS

| | | |
|---|---|---|
| 3,665,728 A | 5/1972 | Stoller |
| 4,487,024 A | 12/1984 | Fletcher et al. |
| D354,292 S | 1/1995 | Monti |
| 5,715,691 A * | 2/1998 | Wagner .................. 62/110 |
| 5,878,595 A | 3/1999 | Wagner |
| 2002/0121096 A1 | 9/2002 | Harrison et al. |
| 2004/0237564 A1* | 12/2004 | Zevlakis .................. 62/340 |

* cited by examiner

Primary Examiner—Melvin Jones
(74) Attorney, Agent, or Firm—Kyle Fletcher

(57) ABSTRACT

The invention is a portable ice maker that is powered by a propane flame. The propane flame introduces heat into an absorption refrigeration cycle consisting of a burner, separator, absorber, evaporator, and condenser. The absorption refrigeration cycle is housed in the rear of the invention and of which the front occupies the freezing compartment. The freezing compartment is encompassed by insulation, and of which the sides are aligned with the cooling coils. The freezing compartment is accessible via a front door, which is also heavily insulated. The freezing compartment is capable of storing a plurality of ice trays or for storing food that requires freezing temperatures in order to avoid spoiling.

8 Claims, 4 Drawing Sheets

PORTABLE ICE MAKER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of ice makers, more specifically, a portable ice maker that cools via an absorption system that is powered by a propane flame.

B. Discussion of the Prior Art

The Wagner Patent (U.S. Pat. No. 5,715,691) discloses a propane powered ice making machine. However, the portable ice maker of the Wagner Patent is only directed to making a four to eight pound conically-shaped block of ice, as opposed to a portable ice cube maker that can double as a refrigerator or freezer for storing food.

The Wagner Patent (U.S. Pat. No. 5,878,595) discloses a portable ice maker which is powered by a heat source. However, the portable ice maker of the Wagner Patent requires the freezing tube and water to be placed within an evaporator coil, as opposed to an open freezing chamber that allows a plurality of ice trays to be inserted or in which the chamber can double as a freezer for storing food.

The Stoller Patent (U.S. Pat. No. 3,665,728) discloses an ice cube making and storing portable cooler. However, the portable ice cube maker of the Stoller Patent does not rely on a propane flame to power the refrigeration process, but instead utilizes a pressurized spray can to pump refrigerant through the refrigeration cycle.

The Harrison et al. Patent Application Publication (U.S. Pub. No. 2002/0121096) discloses a heat powered portable ice maker. However, the ice maker of the Harrison application employs a thermoelectric process to power the refrigeration cycle as opposed to a heat drive refrigeration cycle.

The Fletcher et al. Patent (U.S. Pat. No. 4,487,024) discloses a portable ice maker. However, the portable ice maker of the Fletcher Patent employs a thermoelectric process to power the refrigeration cycle as opposed to a remotely powered ice maker that is powered by a propane flame.

The Monti Patent (U.S. Pat. No. Des. 354,292) illustrates a design for an ice making cooler, which does not illustrate a propane powered refrigeration cycle.

In light of the above discussed prior art there is a need for a propane flame powered refrigeration cycle that operates a portable ice maker and/or freezer.

BRIEF SUMMARY OF THE INVENTION

The invention is a portable ice maker that is powered by a propane flame. The propane flame introduces heat into an absorption refrigeration cycle consisting of a burner, separator, absorber, evaporator, and condenser. The absorption refrigeration cycle is housed in the rear of the invention and of which the front occupies the freezing compartment. The freezing compartment is encompassed by insulation, and of which the sides are aligned with the cooling coils. The freezing compartment is accessible via a front door, which is also heavily insulated. The freezing compartment is capable of storing a plurality of ice trays or for storing food that requires freezing temperatures in order to avoid spoiling.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figures 1, 2:
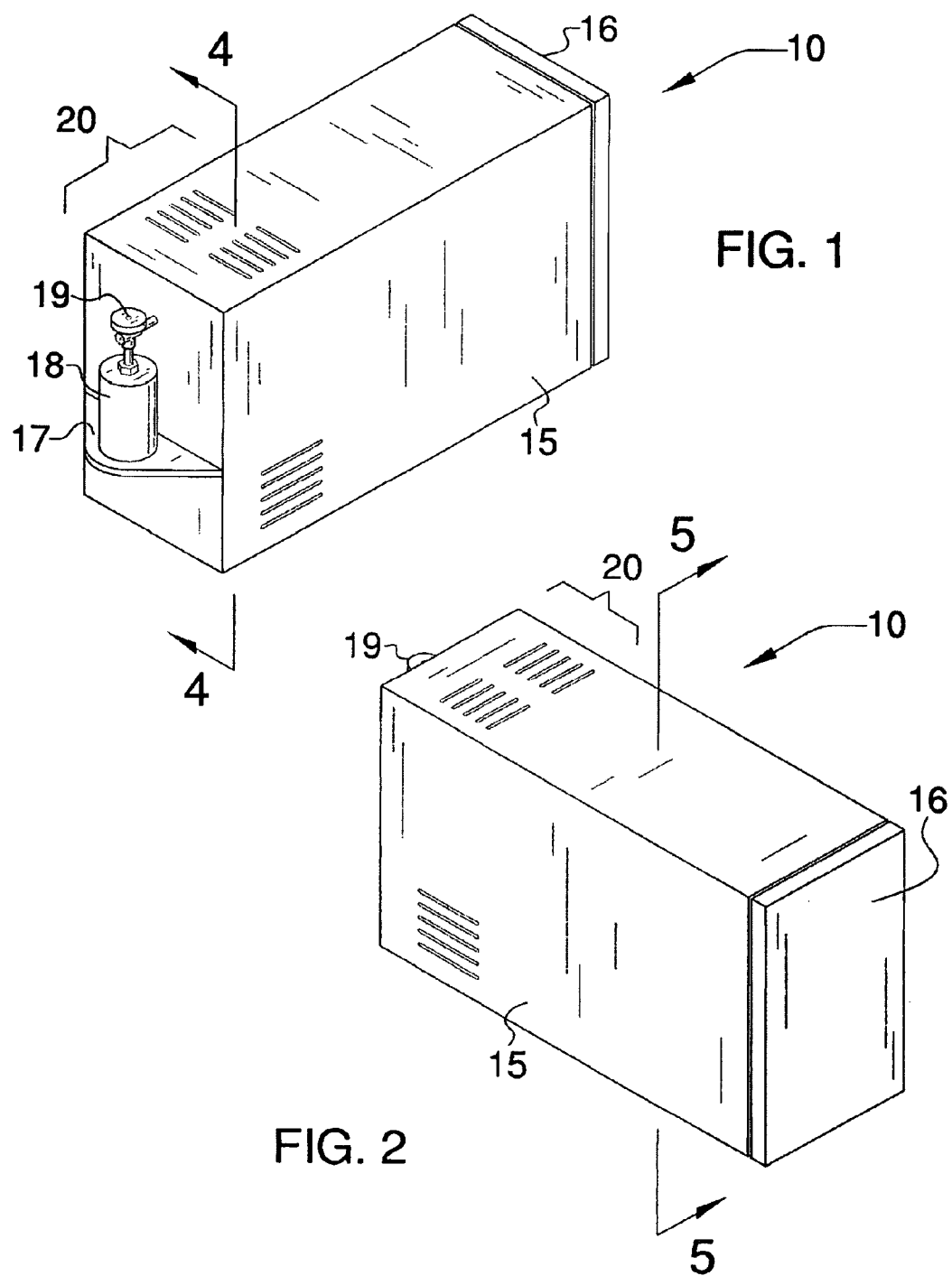
FIG. 1 illustrates an isometric rendering of the rear side of the invention.
FIG. 2 illustrates an isometric rendering of the front side of the invention.
Figure 3:
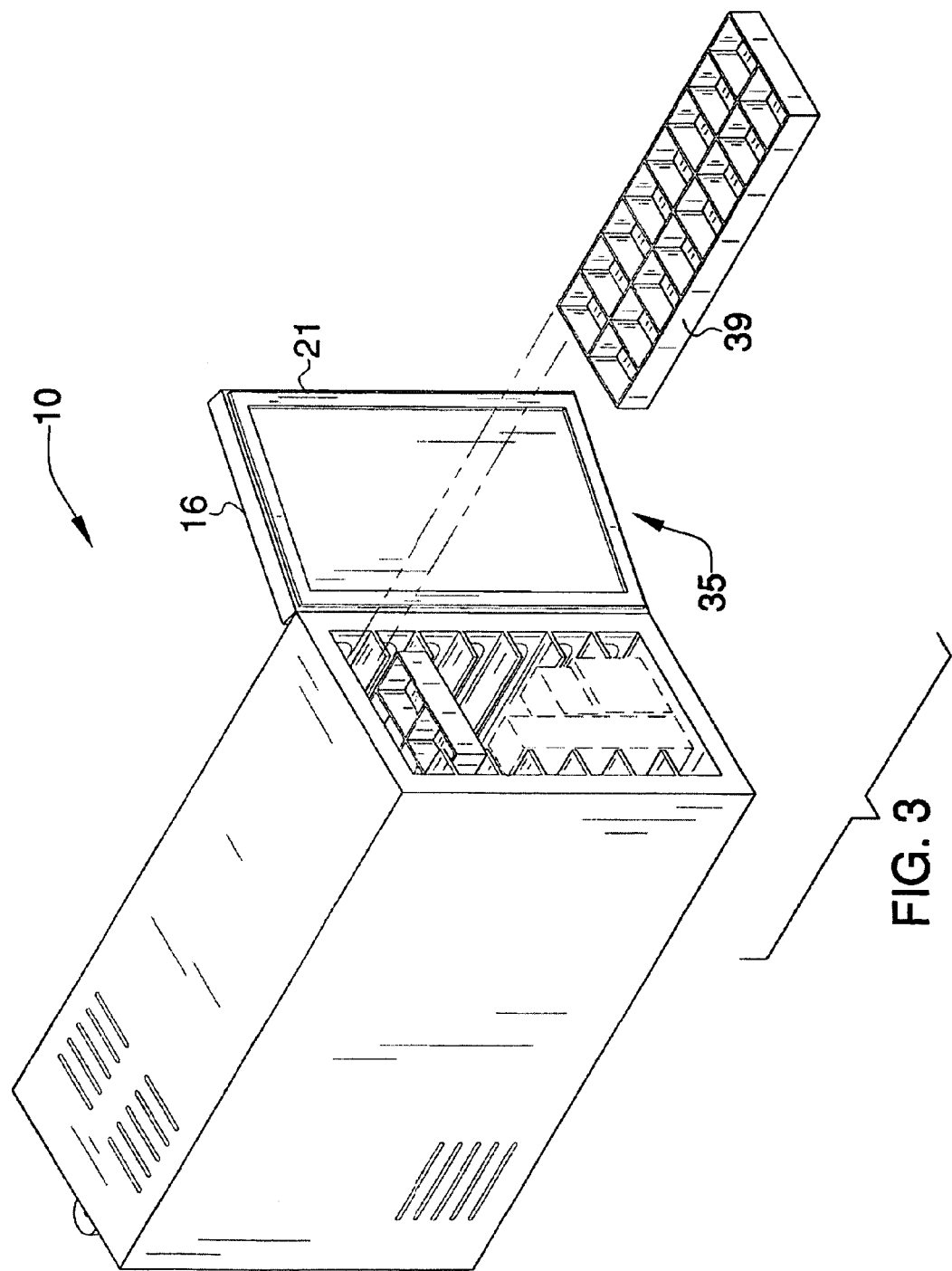
FIG. 3 illustrates an isometric view of the door open to the freezing compartment with an ice cube tray being removed.
Figure 4:
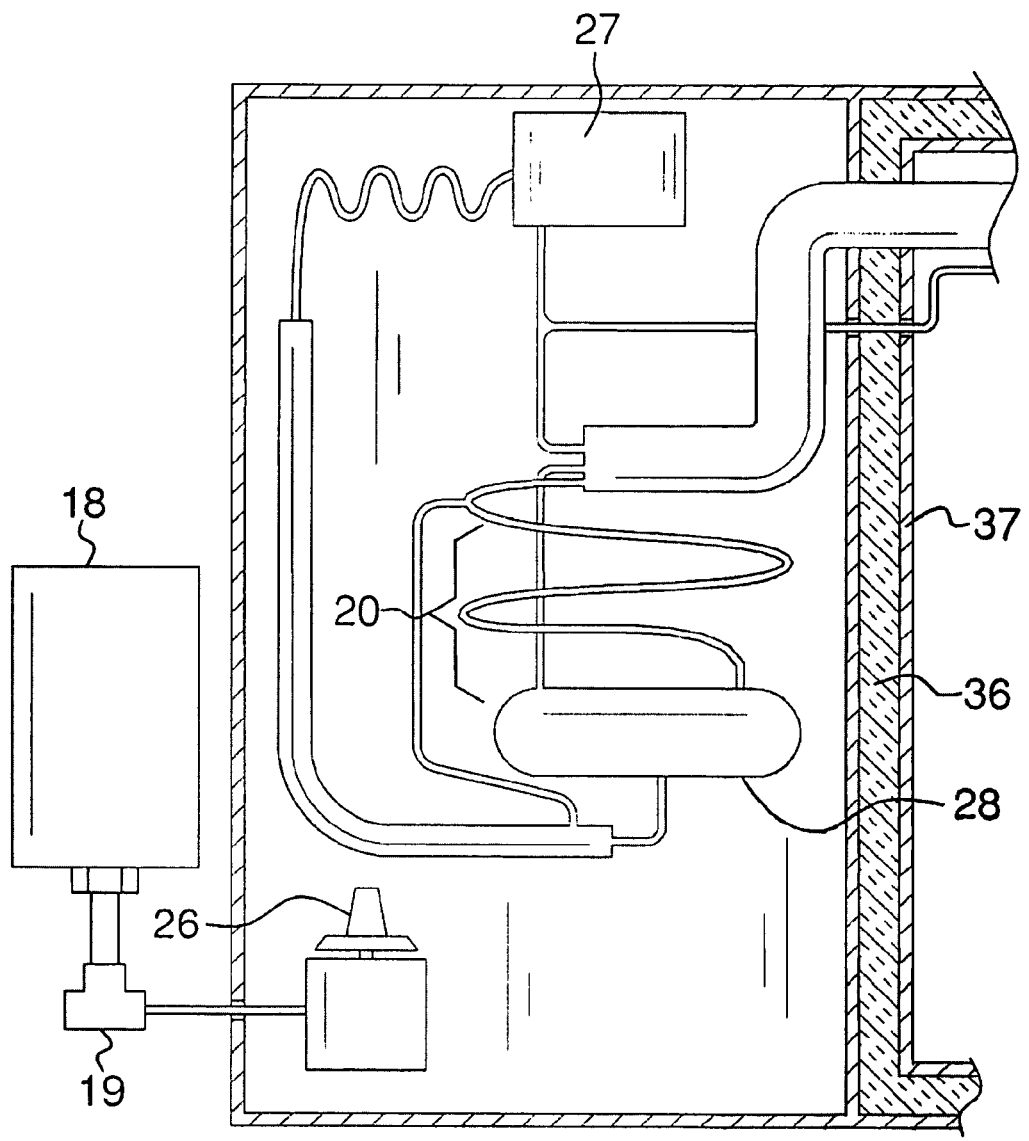
FIG. 4 illustrates a cross-sectional view of the invention along line 4-4 in FIG. 1.
Figure 5:
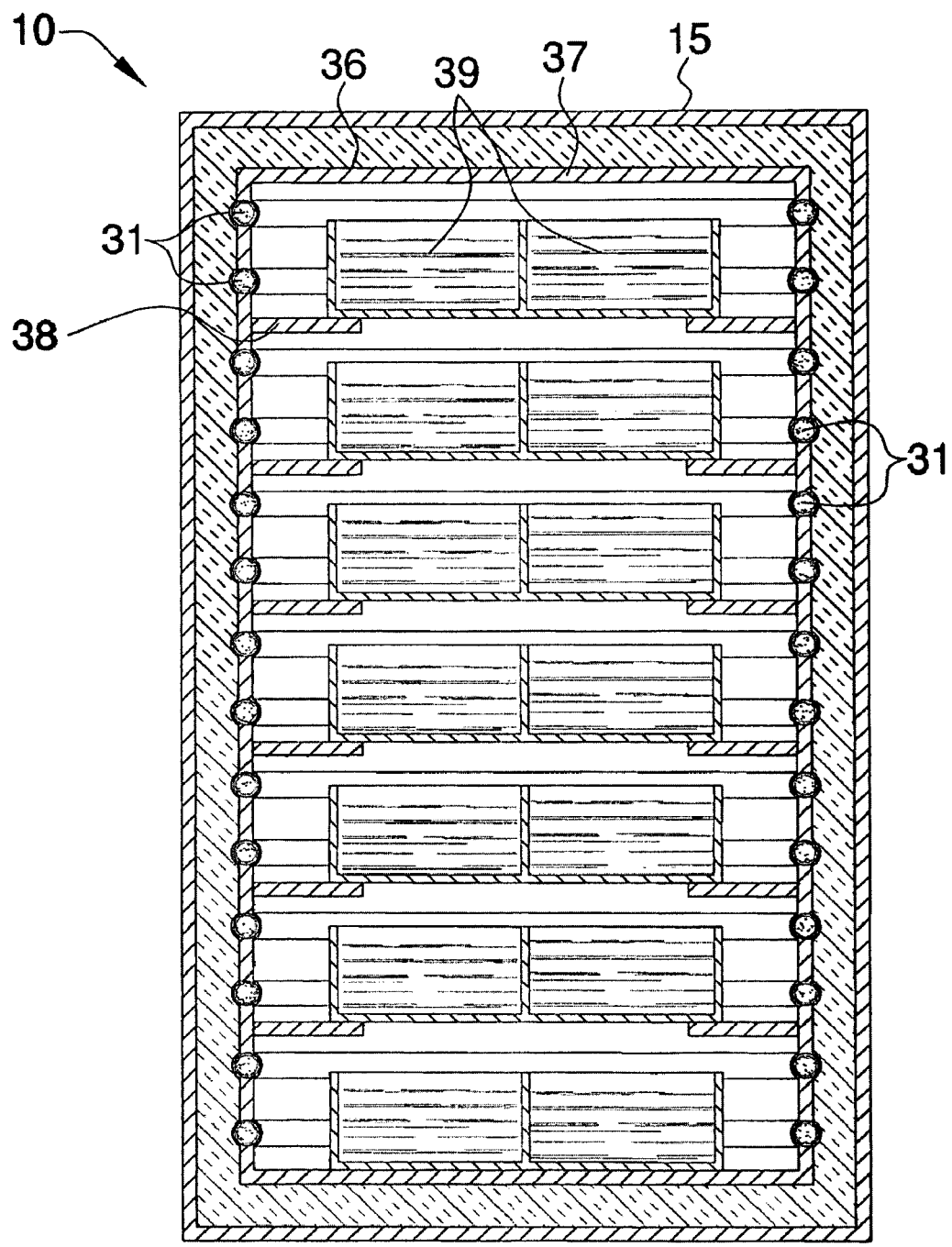
FIG. 5 illustrates a cross-sectional view of the invention along line 5-5 in FIG. 2.

Detailed reference will now be made to the preferred embodiments of the present invention, examples of which are illustrated in FIGS. 1-5. A portable ice maker or freezer 10 (hereinafter invention) comprises a housing 15, a freezer door 16, a propane platform 17, a propane bottle 18, and a valve 19. Located about the rear portion of the housing 15 is a plurality of vent slots 20. The rear interior portion of the housing 15 contains the parts required of an absorption-refrigeration cycle 25.

The absorption-refrigeration cycle 25 includes a burner 26, a separator 27, an absorber 28, a central tube 29, a condenser 30, and a cooling coil 31. The cooling coil 31 is designed to coil back and forth along the left side and right side of the region of the housing 15 containing a freezing compartment 35, which in essence works like an evaporator. It shall be noted that the central tube 29 includes both a boiler (not depicted) and a siphon pump (not depicted).

As previously mentioned the freezing compartment 35 occupies the front of the housing 15, and has the cooling coils 31 lined up along the left and right side. Located within the housing 15 and encompassing the freezing compartment 35 is a layer of insulation 36. The layer of insulation is sandwiched between the housing 15 and an interior lining 37.

The interior lining 37 has a plurality of ice cube tray shelves 38. The ice cube tray shelves 38 protrude minimally from the interior lining 37 so as to leave a large opening amongst the center of the freezing compartment 35.

The ice cube tray shelves 38 are designed to support a plurality of ice cube trays 39.

The freezer door 16 is hingedly attached to the front portion of the housing 15, and is lined with a gasket-seal 21.

The vent slots 20 are designed to allow heat generated from the burner 26 to exit the housing 15.

The absorption-refrigeration cycle 25 operates with a propane gas (not shown) being introduced from the propane bottle 18 and through the valve 19 into the burner 26 where the propane gas (not shown) is burned. The heat generated from the burning propane gas (not shown) applies heat to the central tube 29, which in turn heats up and pressurizes the refrigerant contained within the absorption-refrigeration cycle 25. It shall be noted that the term refrigerant includes Ammonia, water, and Hydrogen.

As a result of the heat being introduced into the absorption-refrigeration cycle 25, the refrigerant pass up via the siphon pump (not depicted) through the separator 27 into the condenser 30 and through the cooling coil 31 where the refrigerant drops the temperature of the freezing compartment 35 to freezing temperatures.

The housing 15, the freezer door 16, and the propane platform 17 are made from a metal.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A portable ice-maker and/or freezer comprising:
   (a) a freezing compartment;
      wherein the freezing compartment has a plurality of ice trays shelves in which a plurality of ice trays are designed to fit into the ice tray shelves;
   (b) a freezer door;
      wherein the freezing compartment is hingedly connected to the freezer door;
   (c) a propane platform;
   (d) a propane bottle;
   (e) a valve;
      wherein the valve connects the propane bottle to a propane line;
   (f) an absorption-refrigeration cycle compartment that contains;
      a burner;
         wherein the propane line connects to the burner;
      an absorber;
      a condenser;
      a cooling coil;
         wherein the cooling coil travels from the absorption-refrigeration cycle compartment to the freezing compartment; and
      a separator.

2. The portable ice-maker and/or freezer as described in claim 1 wherein the freezer door contains a gasket-like seal along the periphery, such that when in contact with the freezing compartment, a seal is formed.

3. The portable ice-maker and/or freezer as described in claim 1 wherein the absorption-refrigeration cycle is charged with a refrigerant consisting of water, Ammonia, and Hydrogen.

4. The portable ice-maker and/or freezer as described in claim 1 wherein the housing, the freezer door, and the propane platform are made from a metal or a durable plastic.

5. A portable ice-maker and/or freezer comprising:
   a freezing compartment that has a plurality of ice trays shelves in which a plurality of ice trays are designed to fit into the ice tray shelves;
   a freezer door that is hingedly connected to the freezer door;
   a propane platform, a propane bottle, and valve that connects the propane bottle to a propane line;
   an absorption-refrigeration cycle compartment that contains a burner in fluid connection with said propane line, an absorber, a condenser, a cooling coil that travels from the absorption-refrigeration cycle compartment to the freezing compartment, and a separator;
   wherein the freezing compartment, the freezer door, and the propane platform are made from a metal or a durable plastic.

6. The portable ice-maker and/or freezer as described in claim 5 wherein the freezer door contains a gasket-like seal along the periphery, such that when in contact with the freezing compartment, a seal is formed.

7. The portable ice-maker and/or freezer as described in claim 5 wherein the absorption-refrigeration cycle is charged with a refrigerant consisting of water, Ammonia, and Hydrogen.

8. The portable ice-maker and/or freezer as described in claim 5 wherein the freezing compartment, the door, the plurality of ice tray shelves, and removable ice trays are made from a metal or a durable plastic.

* * * * *